United States Patent [19]
Shimamoto

[11] Patent Number: 6,147,672
[45] Date of Patent: *Nov. 14, 2000

[54] DISPLAY SIGNAL INTERFACE SYSTEM BETWEEN DISPLAY CONTROLLER AND DISPLAY APPARATUS

[75] Inventor: Hajime Shimamoto, Tokyo, Japan

[73] Assignee: Kabushiki Kaisha Toshiba, Kawasaki, Japan

[*] Notice: This patent is subject to a terminal disclaimer.

[21] Appl. No.: 09/323,914

[22] Filed: Jun. 2, 1999

Related U.S. Application Data

[62] Division of application No. 08/623,170, Mar. 28, 1996, Pat. No. 5,986,641.

[30] Foreign Application Priority Data

Apr. 7, 1995 [JP] Japan ..................................... 7-82806
Nov. 2, 1995 [JP] Japan ..................................... 7-285999

[51] Int. Cl.$^7$ ...................................................... G09G 5/02
[52] U.S. Cl. .......................................................... 345/150
[58] Field of Search ................................... 345/150, 204, 345/205, 208, 211, 212, 213, 98, 87

[56] References Cited

U.S. PATENT DOCUMENTS 5,170,158 12/1992 Shinya ..................................... 345/204
5,555,353 9/1996 Shibazaki .............................. 345/139
5,581,376 12/1996 Harrington ............................ 345/431
5,703,645 12/1997 Kiriyama et al. ..................... 348/138
5,912,657 6/1999 Saito ..................................... 345/150

*Primary Examiner*—Richard A. Hjerpe
*Assistant Examiner*—Ronald Laneau
*Attorney, Agent, or Firm*—Finnegan, Henderson, Farabow, Garrett & Dunner, L.L.P.

[57] ABSTRACT

On a computer body side, there is provided a low voltage parallel-serial conversion circuit for converting R, G and B digital parallel signals of a first potential, which are output from a display controller, to serial signals of a second potential lower than the first potential and converting a display clock signal and a control signal (FP, LP, DATA ENAB) each having the first potential to a clock signal and a control signal (FP, LP, DATA ENAB) each having the second potential. On a display apparatus side, there is provided a low voltage serial-parallel conversion circuit for converting the second-potential R, G and B signals, which are output from the low voltage parallel-serial conversion circuit, to parallel R, G and B signals of the first potential and restoring the second potential clock signal and control signal (FP, LP, DATA ENAB) to the first-potential clock signal and control signal (FP, LP, DATA ENAB). The display color signals, clock signal and control signal output from the low voltage serial-parallel conversion circuit are supplied to a flat panel.

32 Claims, 11 Drawing Sheets

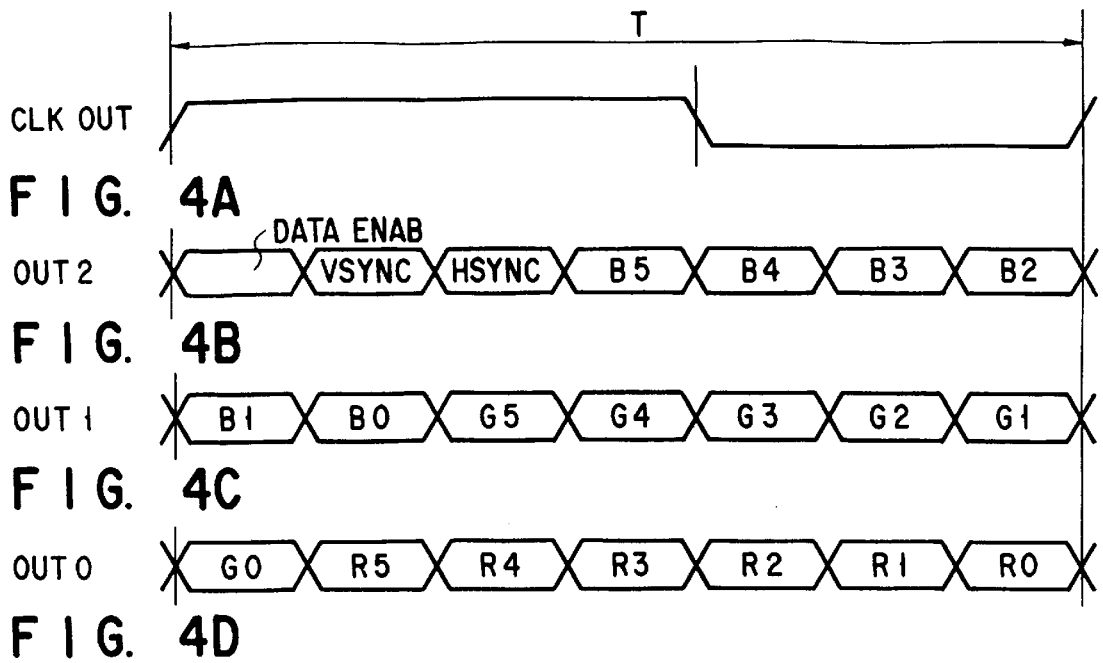
FIG. 4A
FIG. 4B
FIG. 4C
FIG. 4D
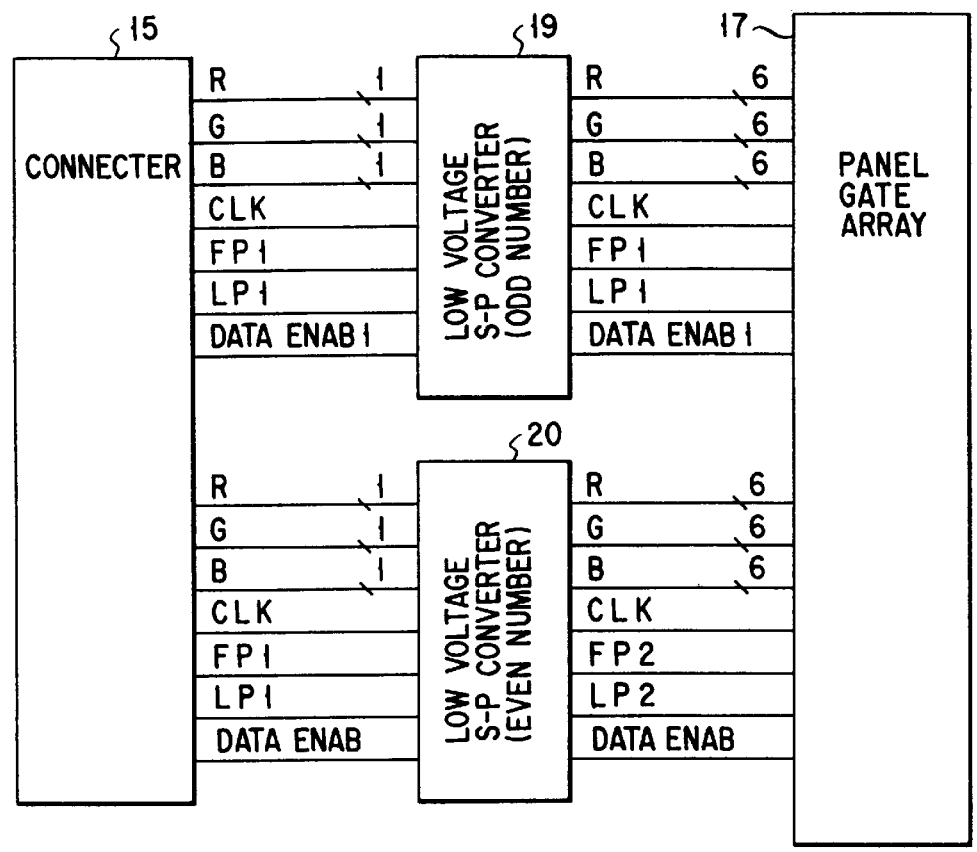
FIG. 6

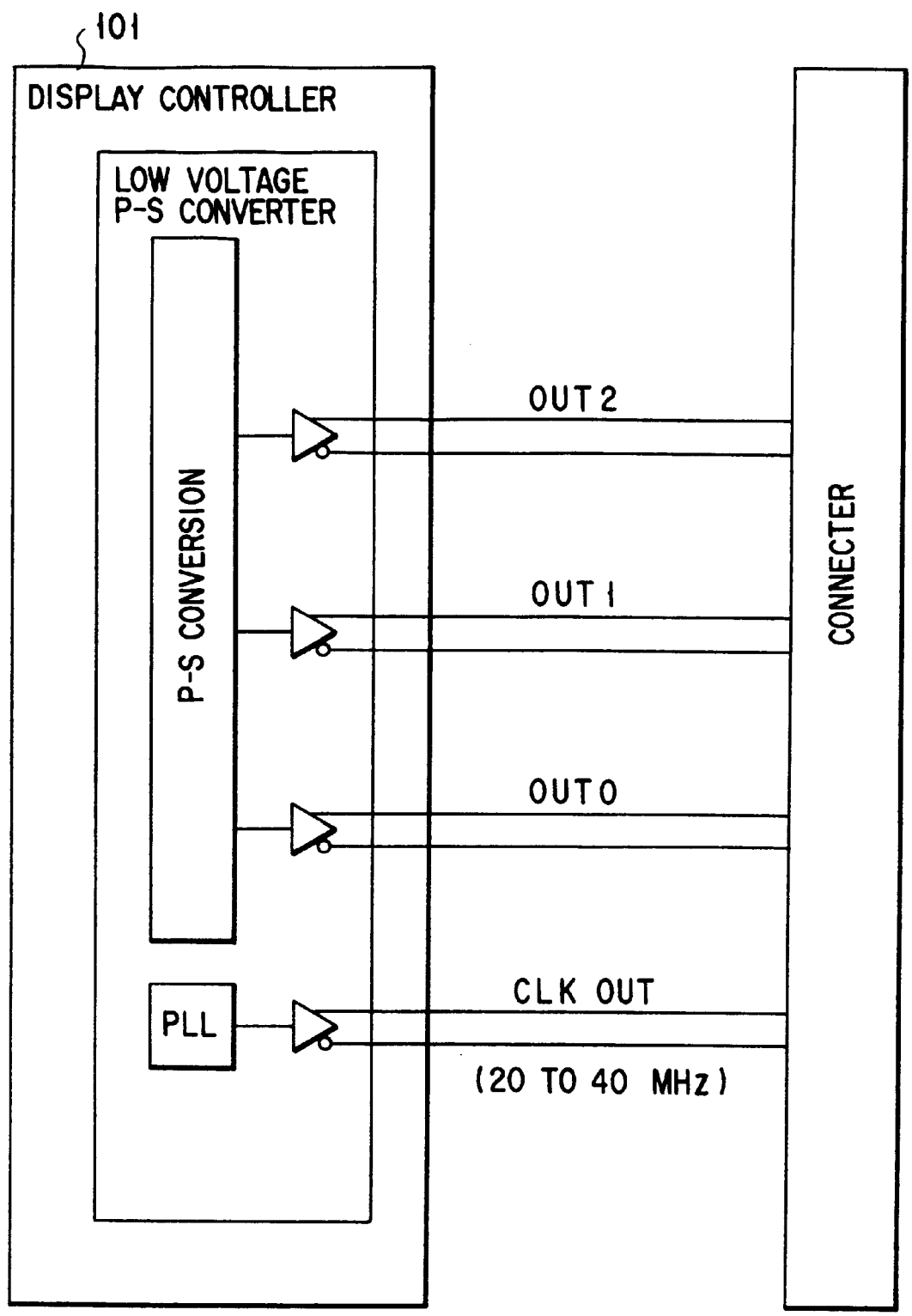
F I G. 9

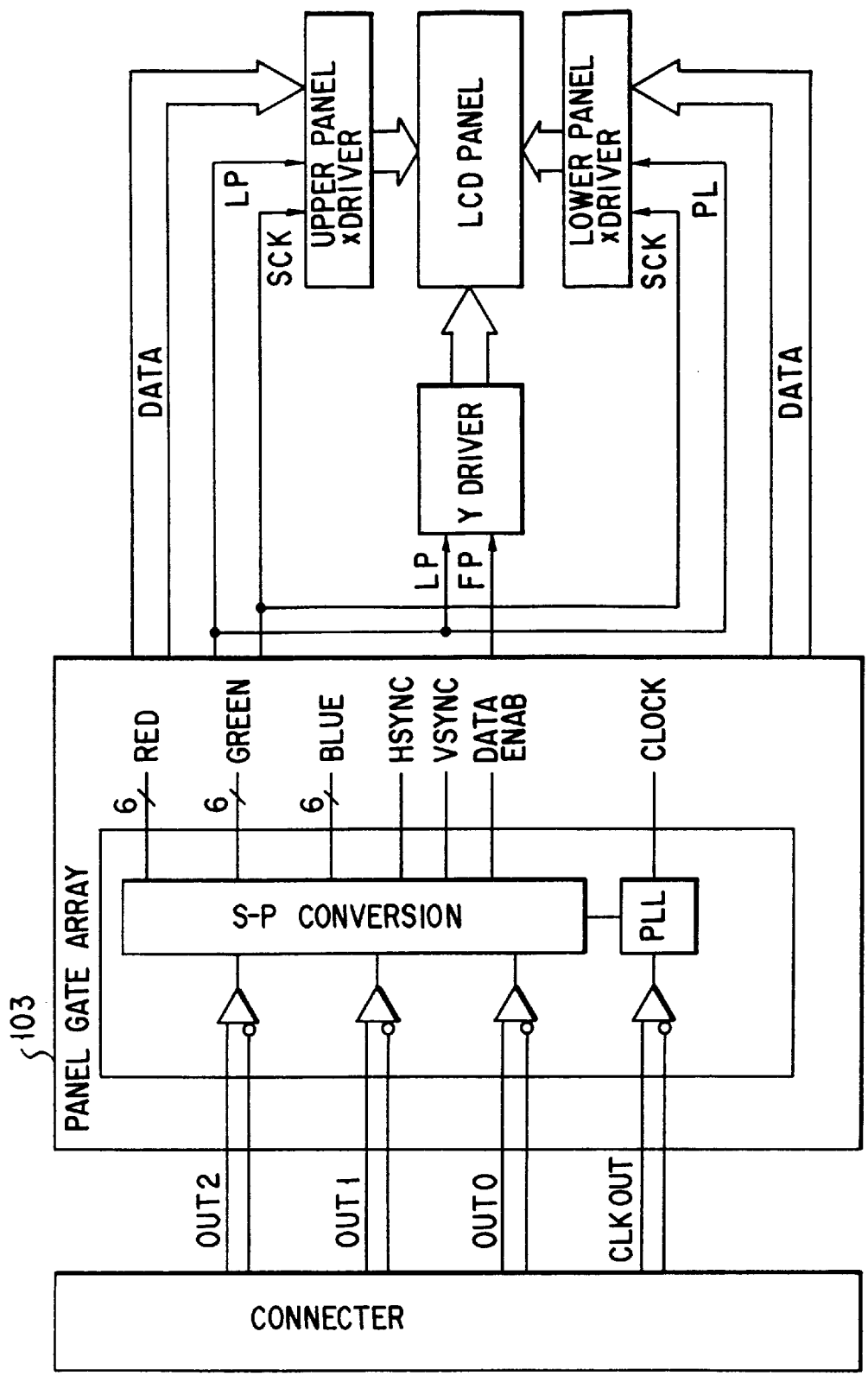
F I G. 10

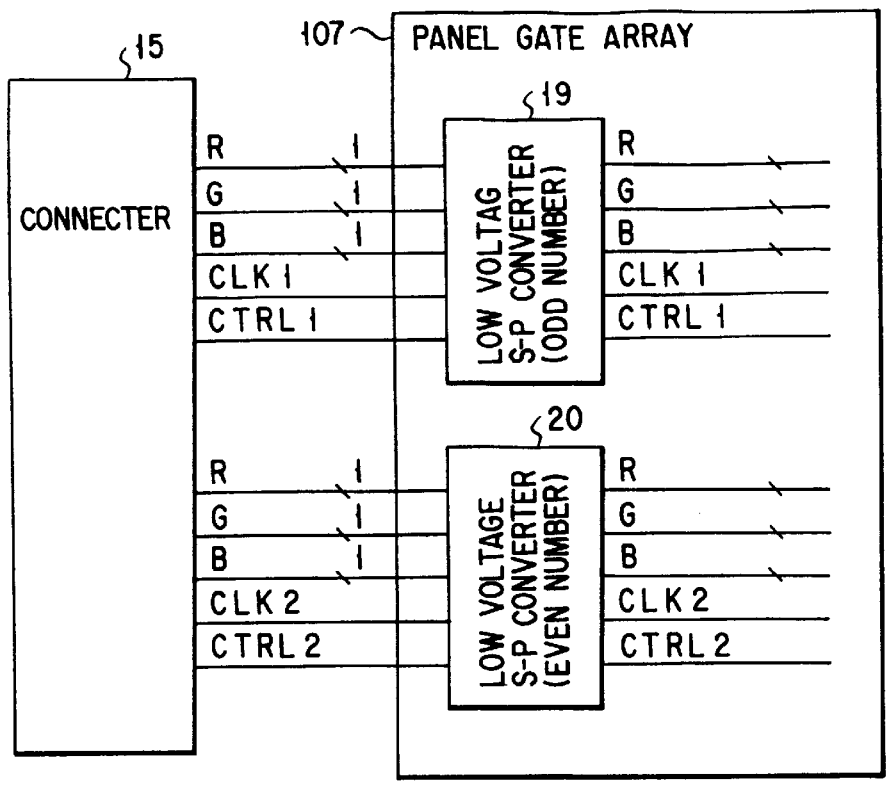
FIG. 12
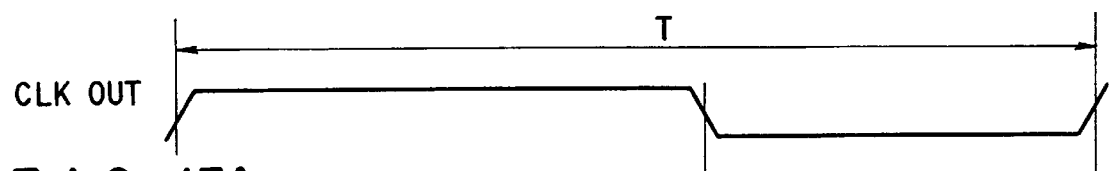
FIG. 13A
FIG. 13B
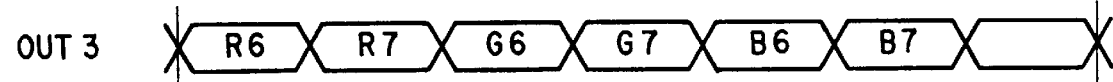
FIG. 13C
FIG. 13D
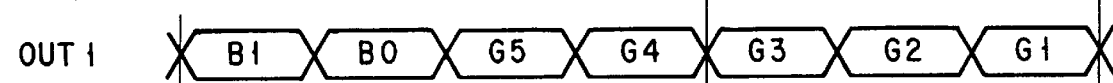
FIG. 13E
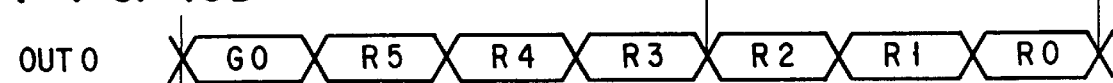

DISPLAY SIGNAL INTERFACE SYSTEM BETWEEN DISPLAY CONTROLLER AND DISPLAY APPARATUS

This is a divisional application of Ser. No. 08/623,170, filed Mar. 28, 1996, now U.S. Pat. No. 5,986,641 which is incorporated herein by reference.

BACKGROUND OF THE INVENTION

1. Field of the Invention

The present invention relates to a display signal interface system between a display controller, such as a computer, and a display apparatus.

2. Description of the Related Art

Recently, with the development of personal computers, there is a tendency that various resolutions are adopted in display apparatuses. An example of a typical display mode is VGA mode (640 dots×480 lines). In addition, there is a tendency that SVGA mode (800 dots×600 lines) and XGA mode with a higher resolution (1024 dots×768 lines) are adopted.

With an increase in resolution, however, the amount of information transferred from a display controller to a display panel increases. Thus, the frequency of a display clock signal increases and the number of interface signal lines between the display controller and the display apparatus increases as well. For example, in the case of the VGA mode, the clock frequency is about 25 MHz and data is input directly to the display panel. Thus, the interface has no special structure. Specifically, the interface is a digital interface, and data is transferred directly to a flat panel display at a clock frequency of 25 MHz.

On the other hand, in order to activate a TFT panel (displayable in 260,000 colors) with a display resolution of 1024×768 dots, the clock output from the display controller needs to be 65 MHz and the number of data lines output from the display controller needs to be 18 (6 R-lines, 6 G-lines, and 6 B-lines). In the case of a TFT panel with a display resolution of 800×600, the clock frequency is 40 MHz. On the other hand, the display controller and the display apparatus are connected to each other via a connector and a harness. It is difficult, in view of electric waves, to transfer display data at such a high clock frequency from the standpoints of, e.g. set-up time and hold time (timing and skewing are difficult). In addition, since display data is transferred at a relatively high voltage (at TTL level of about 5 V), the influence by electric wave radiation upon the ambience is great.

Under the circumstances, there is an idea that the number of data lines is doubled, without inputting data directly to the flat panel, thereby the frequency of the shift clock is reduced to ½. In this method, the number of data lines is multiplied and the interface between the display controller and flat panel is complicated.

Jap. Pat. Appln. KOKAI Publication No. 1-118196 discloses a transfer system wherein digital display data (16-bit gradient data) output from a display controller is converted to a low-voltage analog serial signal by a D/A converter and transferred to a display apparatus, and the analog serial signal is converted to a digital display signal by an A/D converter on the display apparatus side, and further the digital display signals for four pixels are put together by a serial/parallel conversion circuit and transferred to a flat panel in parallel. Besides, Jap. Pat. Appln. KOKAI Publication No. 1-118195 discloses a system wherein digital display data output from a display controller is converted in parallel by a serial/parallel conversion circuit and transferred in parallel to the display apparatus side as low-voltage analog signal by a D/A converter, and on the display apparatus side the received parallel display data is converted to a digital display signal by an A/D converter and supplied to a flat panel.

Furthermore, Jap. Pat. Appln. KOKAI Publication No. 2-77083 discloses a display clock signal transfer system wherein, in a clock transfer mechanism between a display controller and a flat display panel, a display clock signal output from the display controller is converted to a low-potential clock signal and transferred to a flat panel display, and the low-potential clock signal is boosted on the flat panel display side and supplied to the flat panel display. Although this document shows means for preventing the influence of electric wave radiation upon the ambience, it is silent on the means for solving problems relating to an increase in number of signal lines of interface signals between the display controller and display apparatus in a high-resolution display mode, an increase in speed of shift clocks, etc.

As has been described above, in the prior art, display signals are transferred between the display controller and display apparatus at a relatively high voltage (CMOS/TTL level) and at a higher clock frequency in accordance with higher resolution display. Thus, a radio wave interference occurs and it is difficult to obtain timing and skew adjustments. On the other hand, if the transfer shift clock is divided, the number of data lines increases and the interface between the display controller and flat panel is complicated. Besides, in order to reduce the influence on the ambience as much as possible, a more effective countermeasure to electromagnetic interference (EMI) has been desired.

SUMMARY OF THE INVENTION

The object of the present invention is to provide a display signal interface system wherein an influence of electric wave radiation on the ambience can be prevented in a high-resolution display mode and the number of interface signal lines can be remarkably reduced.

In order to achieve the object, according to a first aspect of the invention, there is provided an interface system for display signals between a display apparatus displayable with high resolution and a display controller for driving the display apparatus, the interface system comprising: a low voltage parallel-serial conversion circuit for converting display color signals of R (Red), G (Green) and B (Blue) output from the display controller, which are plural-bit digital parallel signals each having a first potential, to analog serial signals each having a second potential lower than the first potential, and converting a clock signal of the first potential and a control signal of the first potential, which are output from the display controller, to a clock signal of the second potential and a control signal of the second potential; and a low voltage serial-parallel conversion circuit, provided on the display apparatus side, for converting the display color signals of the second-potential analog serial signals output from the low voltage parallel-serial conversion circuit to the first-potential digital parallel signals, and boosting and converting the clock signal and control signal of the second potential output from the low voltage parallel-serial conversion circuit to the first-potential clock signal and control signal.

According to a second aspect of the invention, there is provided an interface system for display signals between a display apparatus displayable with high resolution and a display controller for driving the display apparatus, the interface system comprising: a display control gate array for dividing each of display color signals of R (Red), G (Green) and B (Blue) output from the display controller, which are plural-bit digital parallel signals each having a first potential, into an even-number-th display color signal and an odd-number-th display color signal and outputting the divided display color signals, and dividing a control signal for display into an even-number-th control signal and an odd-number-th control signal and outputting the divided control signals, and frequency-dividing a clock signal with the first potential and a first frequency into a first clock signal and a second clock signal each having the first potential and a second frequency lower than the first frequency; a first low voltage parallel-serial conversion circuit for converting each of the even-number-th display color signals output from the display control gate array to an analog serial signal of a second potential lower than the first potential, and converting the first clock signal of the first potential and the second frequency and the control signal of the first potential, which are output from the display control gate array, to a first clock signal having the second frequency and a second potential lower than the first potential and a control signal of the second potential; a second low voltage parallel-serial conversion circuit for converting each of the odd-number-th display color signals output from the display control gate array to an analog serial signal of a second potential lower than the first potential, and converting the second clock signal of the first potential and the second frequency and the control signal of the first potential, which are output from the display control gate array, to a second clock signal having the second frequency and a second potential lower than the first potential and a control signal of the second potential; a first low voltage serial-parallel conversion circuit, provided on the display apparatus side, for converting each of the even-number-th display color signals or the second-potential analog serial signals output from the first low voltage parallel-serial conversion circuit to a digital parallel signal of the first potential, and boosting and converting the first clock signal of the second potential and the second frequency and the control signal of the second potential, which are output from the first low voltage parallel-serial conversion circuit, to a first clock signal of the first potential and the second frequency and a control signal of the first potential; and a second low voltage serial-parallel conversion circuit, provided on the display apparatus side, for converting each of the odd-number-th display color signals or the second-potential analog serial signals output from the second low voltage parallel-serial conversion circuit to a digital parallel signal of the first potential, and boosting and converting the second clock signal of the second potential and the second frequency and the control signal of the second potential, which are output from the second low voltage parallel-serial conversion circuit, to a second clock signal of the first potential and the second frequency and a control signal of the first potential.

According to the present invention, display signals are transferred serially from a display controller to a flat panel at high speed by using an IC for converting multi-bit CMOS/TTL-level signals to LVDS (Low Voltage Differential Signaling) data. Thus, the value of amplitude of signals can be reduced, and the number of interface signal lines can be remarkably reduced.

According to this invention, a low voltage parallel-serial conversion circuit is provided at an output stage of the display controller on the computer body side. In SVGA display mode with, e.g. 800 dots×600 lines, the low voltage parallel-serial conversion circuit converts digital R, G and B parallel signals of TTL level output from the display controller, a field pulse signal (FP) (corresponding to VSYNC signal), a latch pulse signal (LP) (corresponding to HSYNC signal) and a data enable signal (DATA ENAB) to low-potential analog serial R, G and B signals and low-potential control signals (FP, LP, DATA ENAB). In addition, the conversion circuit converts a display clock signal to a low-potential display clock signal. The converted signals are transferred to the flat panel display side via a connector and a harness. A low voltage serial-parallel conversion circuit is connected to the flat panel display side via a connector.

The low voltage serial-parallel conversion circuit restores the low-potential analog serial R, G and B signals and control signals (FP, LP, DATA ENAB) received from the portable computer body side to the digital R, G and B signals and control signals (FP, LP, DATA ENAB) of the original potential, and also restores the low-potential display clock signal to the clock signal of the original potential. The restored signals are supplied to a flat panel driving/controlling circuit. Thus, the display signals are transferred between the portable computer body side and flat panel side at low potential in an analog serial manner. Therefore, even if the amount of display data increases, the number of display signal interface lines can be reduced. Moreover, the signal level can be reduced to prevent electromagnetic interference.

Besides, in the case of XGA mode (1024×768) or a higher-resolution mode, two low voltage parallel-serial conversion circuits are provided on the portable computer body side, and two low voltage serial-parallel conversion circuits are provided on the flat panel display side. Even-number-th R, G and B signals and control signals (FP, LP, DATA ENAB) and odd-number-th R, G and B signals and control signals (FP, LP, DATA ENAB), which are output from the display controller, are processed respectively. Thereby, an increased amount of display data can be transferred without increasing the frequency of the display clock signal.

BRIEF DESCRIPTION OF THE DRAWINGS

FIGS. 4A through 4D show waveforms of output signals OUT2, OUT1, OUT0 and CLKOUT output from a low voltage parallel/serial converter 5 shown in FIG. 2;

FIG. 6 is a block diagram of the flat panel display section, showing said another embodiment of the display interface system of the present invention;

FIG. 9 is a block diagram of the PC body section showing still another embodiment of the invention in which the display resolution is 800×600;

FIG. 10 is a block diagram of the flat panel section showing said another embodiment of the invention in which the display resolution is 800×600;

FIG. 12 is a block diagram of the flat panel section showing said another embodiment of the invention in which the display resolution is 1024×768; and FIGS. 13A through 13E show waveforms of output signals OUT3, OUT2, OUT1, OUT0 and CLKOUT output from the low voltage parallel/serial conversion circuit in the case where each of color signals of R, G and B is formed of eight bits.

DETAILED DESCRIPTION OF THE PREFERRED EMBODIMENTS

Embodiments of the present invention will now be described with reference to the accompanying drawings.

Figure 1:
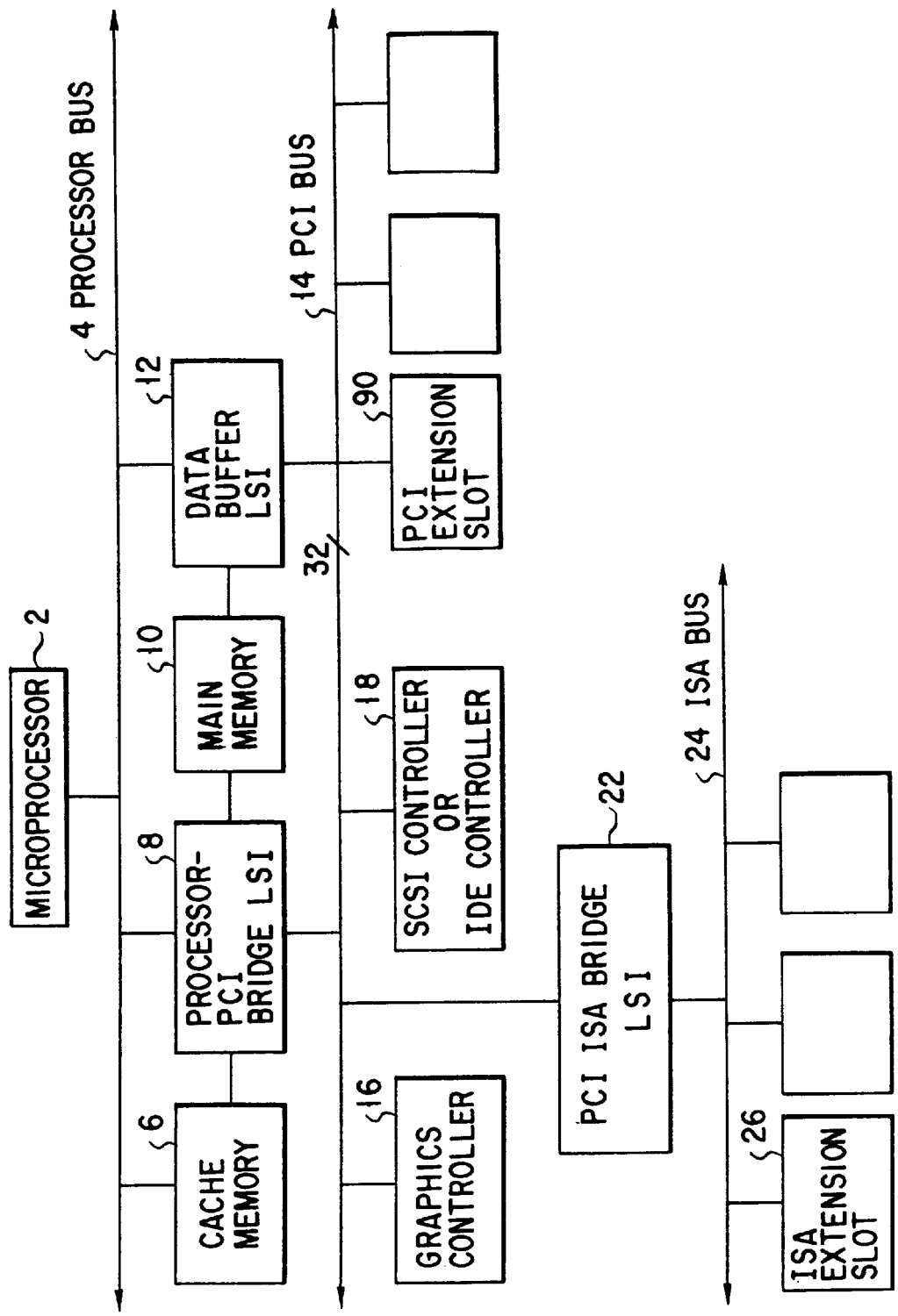
FIG. 1 is a system block diagram of a computer to which a display interface system of the present invention is applied.

FIG. 1 is a system block diagram of a computer to which a display interface system of the present invention is applied. A 32-bit microprocessor 2 is connected to a processor bus 4. A cache memory 6, a processor-PCI bridge LSI 8, a main memory 10 and a data buffer LSI 12 are connected to the processor bus 4. The processor bus 4 has a bus width of 32 bits, 64 bits or 128 bits. The processor-PCI bridge LSI 8 is an LSI having, e.g. a bus width conversion function for connecting the microprocessor 2 and a PCI bus 14. The PCI bus 14 has a bus width of 32 bits. A graphics controller 16, peripheral LSIs such as an external memory controller, and a PCI extension slot 90 are connected to the PCI bus 14. The external controller is, for example, an IDE (integrated device electronics) controller or SCSI (small computer system interface) controller 18. The graphics controller 16 is an LSI with a drawing function, for supporting VGA (Video Graphics Array) (640 dots×480 lines), SVGA (800 dots×600 lines) and XGA (1024 dots×768 lines). Furthermore, an ISA bus 24 is connected to the PCI bus 14 via a PCI-ISA bridge LSI 2.

Figure 2:
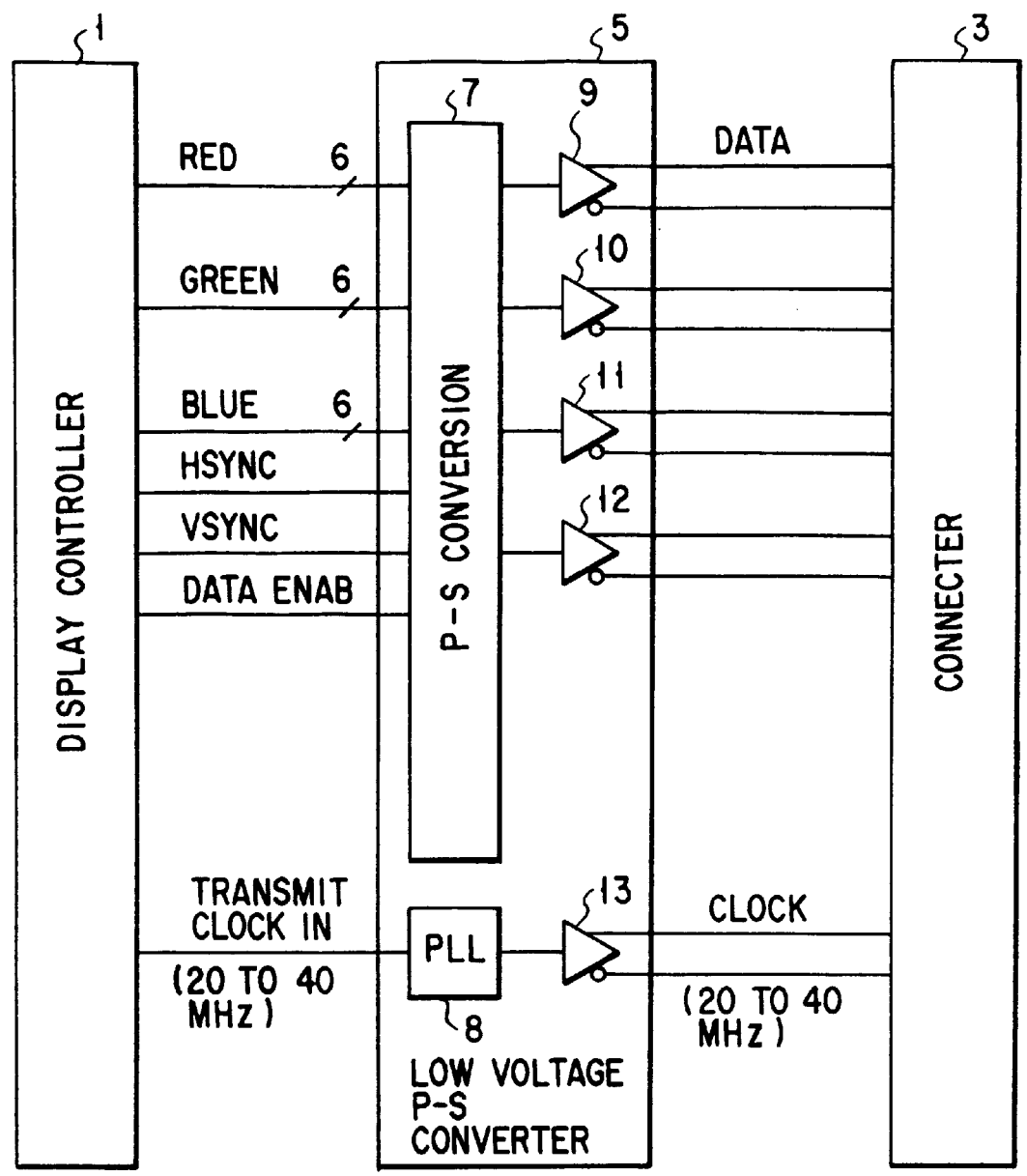
FIG. 2 is a block diagram of a PC body section, showing an embodiment of the display interface system of the present invention.
Figure 3:
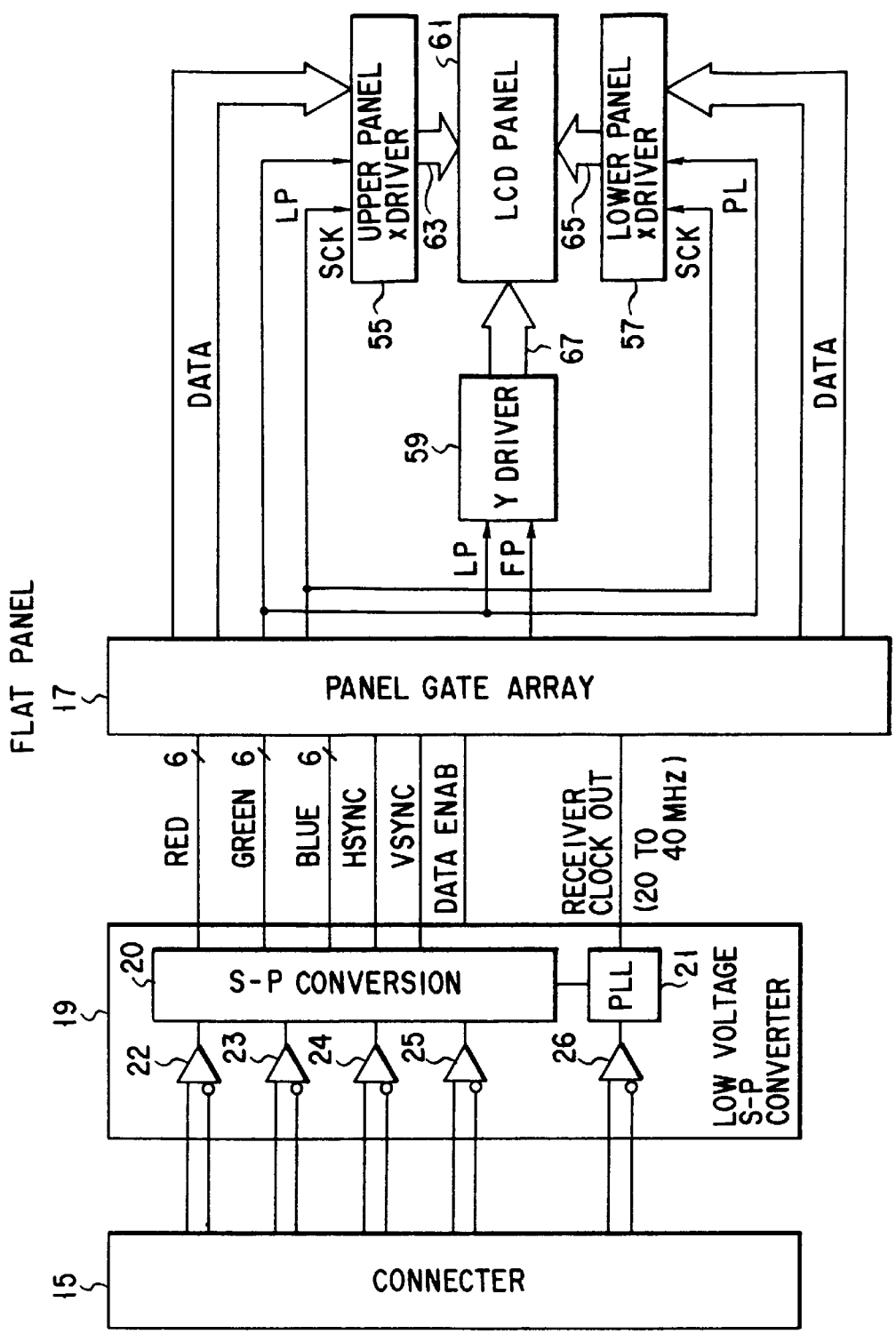
FIG. 3 is a block diagram of a flat panel display section, showing the embodiment of the display interface system of the present invention.

FIG. 2 is a block diagram of a computer body ("PC body") section, showing an embodiment of the display interface system of the present invention, and FIG. 3 is a block diagram of a flat panel display section according to this embodiment, in the case where the display resolution is 800×600.

In FIG. 2, a display controller 1 outputs digital display signals (6-bit R signal, 6-bit G signal and 6-bit B signal) to be displayed on a flat panel display such as a liquid crystal display (LCD) device, a field pulse signal FP (corresponding to VSYNC signal) corresponding to one screen cycle, a latch pulse signal LP (corresponding to HSYNC signal) corresponding to one line cycle, a DATA ENAB signal indicating the beginning of effective display data, and a display clock signal (CLK). The display controller 1 is, for example, CHIPS65545 of U.S. CHIPS TECHNOLOGY or Cirrus 7542 of U.S. CIRRUS LOGIC.

A low voltage parallel/serial (P-S) converter 5 is connected between the display controller 1 and a connector 3. The low voltage P-S converter 5 has a CMOS structure and comprises a P-S conversion circuit 7 for converting parallel data to serial data, a PLL (Phase Locked Loop) circuit 8 and first to fifth drivers, 9, 10, 11, 12 and 13. The P-S conversion circuit 7 converts to three low-voltage serial data sequences the total 21 bits of the 6-bit R (Red) digital data (CMOS/TTL data), 6-bit G (Green) digital data (CMOS/TTL data), 6-bit B (Blue) digital data (CMOS/TTL data), FP signal (VSYNC), LP signal (HSYNC) and DATA ENAB signal.

The PLL circuit 8 phase-controls the input transmission clock and transmits the phase-lock transmission clock via the fifth driver 13 in parallel with the data sequences. The 28-bit input data is sampled and transmitted in each transmission cycle. The transmission clock frequency is 20 MHz to 40 MHz. In the case of the transmission frequency of 40 MHz, 18-bit R, G and B data and 4-bit LCD timing data and control data (FP, LP, DATA ENAB) is transmitted at a rate of 280 Mbps per data channel. Accordingly, 280 Mbps×4= 1120 Mbps=140 Mbytes can be transmitted per second via the first to fourth data links. The low voltage P-S converter 5 outputs to the flat panel side via the PC body-side connector 3 the low-potential R, G and B serial signals, various control signals (DATA ENAB, FP, LP, SCK) and low-potential clock signal.

FIG. 3 is a block diagram showing the inside of the flat panel section. In FIG. 3, a low voltage S-P converter 19 is connected between a connector 15 and a panel gate array 17. The low voltage S-P converter 19 has a CMOS construction and comprises a S-P conversion circuit 20, a PLL circuit 21 and first to fifth drivers 22 to 26. The S-P conversion circuit 20 converts analog serial R, G and B signals, which are received via the connector 15 and drivers 22 to 25, the 6-bit parallel/digital signals and also converts received analog serial control signal to digital control signals.

The PLL circuit 21 boosts a low potential clock signal received via the fifth driver 26 and restores it to the original clock signal. The low voltage S-P converter 19 outputs to the panel gate array 17 the converted R, G and B signals, FP, LP and DATA ENAB control signals and clock signal. On the basis of the received display signals (R, G and B), control signals (FP, LP, DATA ENAB) and clock signal (CLK), the panel gate array 17 drives an upper panel X driver 55, a lower panel X driver 57 and a Y driver 59 in accordance with associated various timing signals and outputs to an LCD panel 61 the display data read in the shift registers within the upper panel X driver 55 and lower panel X driver 57.

The aforementioned various timing signals include a latch pulse (LP) corresponding to one line cycle, a field pulse (FP) corresponding to one screen cycle and shift clocks (SCK) for reading data in the shift registers within the upper panel X driver 55 and lower panel X driver 57. The LCD panel 61 comprises two panels, i.e. upper and lower panels. In the LCD panel 61, signal lines 62 connected to the upper panel X driver 55, signal lines 65 connected to the lower panel X driver 57 and signal lines 67 connected to the Y driver 59 are arranged in a matrix.

Specific lines in the LCD panel 61 are selected by shift clock pulses produced in the Y driver 59 and supplied via the signal lines 67. Data output from the upper panel X driver 55 and lower panel X driver 57 via the signal lines 63 and 65 is supplied to the selected pixels, thereby effecting screen display.

The operation of the embodiment of this invention having the above structure will now be described.

The display controller 1 on the portable computer body side outputs the 6-bit R, G and B data, control signals (DATA ENAB, FP, LP, SCK) and display clock signal (CLK) to the low voltage P-S converter 5. In the low voltage P-S conversion circuit 5, the P-S conversion circuit 7 converts the 6-bit R, G and B parallel digital signals to low potential analog serial signals (345 mV in this embodiment) and converts the control signals (FP, LP, DATA ENAB) and clock signal (CLK) to low potential control and clock signals (345 mV in this embodiment), and the converted signals are output via the first to fifth drivers 9, 10, 11, 12 and 13.

FIG. 4 shows waveforms of outputs from the first to fifth drivers 9 to 13. As is shown in FIG. 4D, the driver 12 (OUT0) outputs color signals "G0", "R5", "R4", "R3", "R2", "R1" and "R0". The driver 11 (OUT1) outputs color signals "B1", "B0", "G5", "G4", "G3", "G2" and "G1". The driver 10 (OUT2) outputs in a mixed manner control signals and color signals, "DATA ENAB", "FP", "LP", "B5", "B4", "B3" and "B2". These signals are output to the flat panel display section via the connector 3.

On the flat panel display side, the serially transferred R, G and B signals, control signals (ENAB, FP, LP, SCK) and clock signal (CLK) are received via the connector 15 and supplied to the low voltage S-P converter 19. In the low voltage S-P converter 19, the S-P conversion circuit 20 boosts the received low-potential analog serial R, G and B signals and converts them to digital parallel signals of the original potential. Further, the control signals and clock signal (CLK) are boosted up to the original potential. These boosted signals are output to the internal gate array 17. Based on the received R, G and B signals, control signals and clock signal (CLK), the gate array 17 activates the upper panel X driver 55, lower panel X driver 57 and Y driver 59 at various timings and outputs to the TFTLCD panel 61 the display data read in the shift registers within the upper panel X driver 55 and lower panel X driver 57. As a result, display data is displayed on the LCD panel 61.

Figure 5:
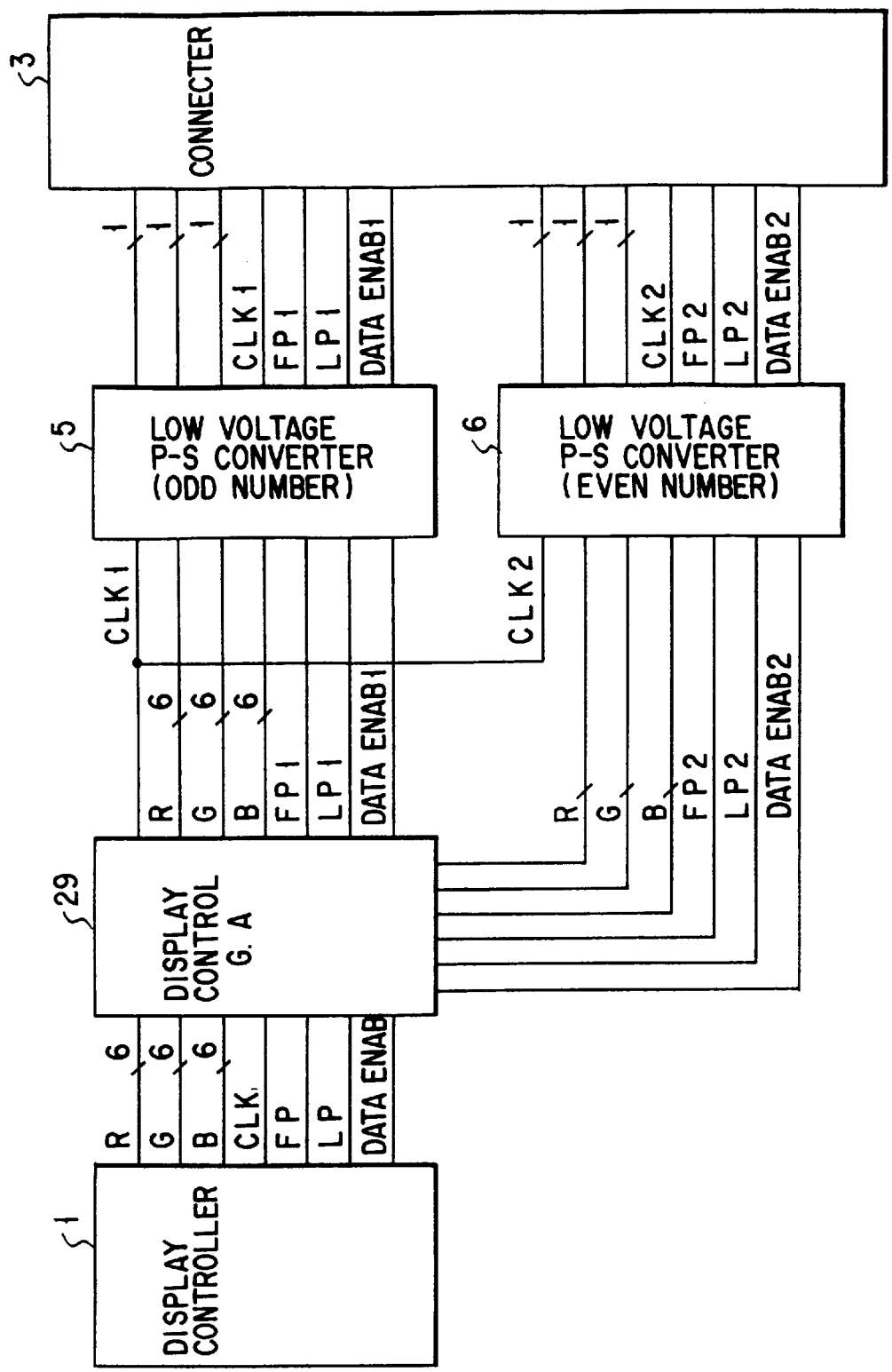
FIG. 5 is a block diagram of the PC body section, showing another embodiment of the display interface system of the present invention.

FIGS. 5 and 6 are block diagrams of the display interface system in the case where the display resolution is, for example, 1024×768. FIG. 5 shows the internal structure of the PC body section, and FIG. 6 shows the internal structure of the flat panel section. As is shown in FIG. 5, a display control gate array 29 is connected to the output stage of the display controller 1. The display control gate array 29 divides the display clock signal to ½ and converts the display signal to an odd-number-th display signal and an even-number-th display signal.

Figure 7:
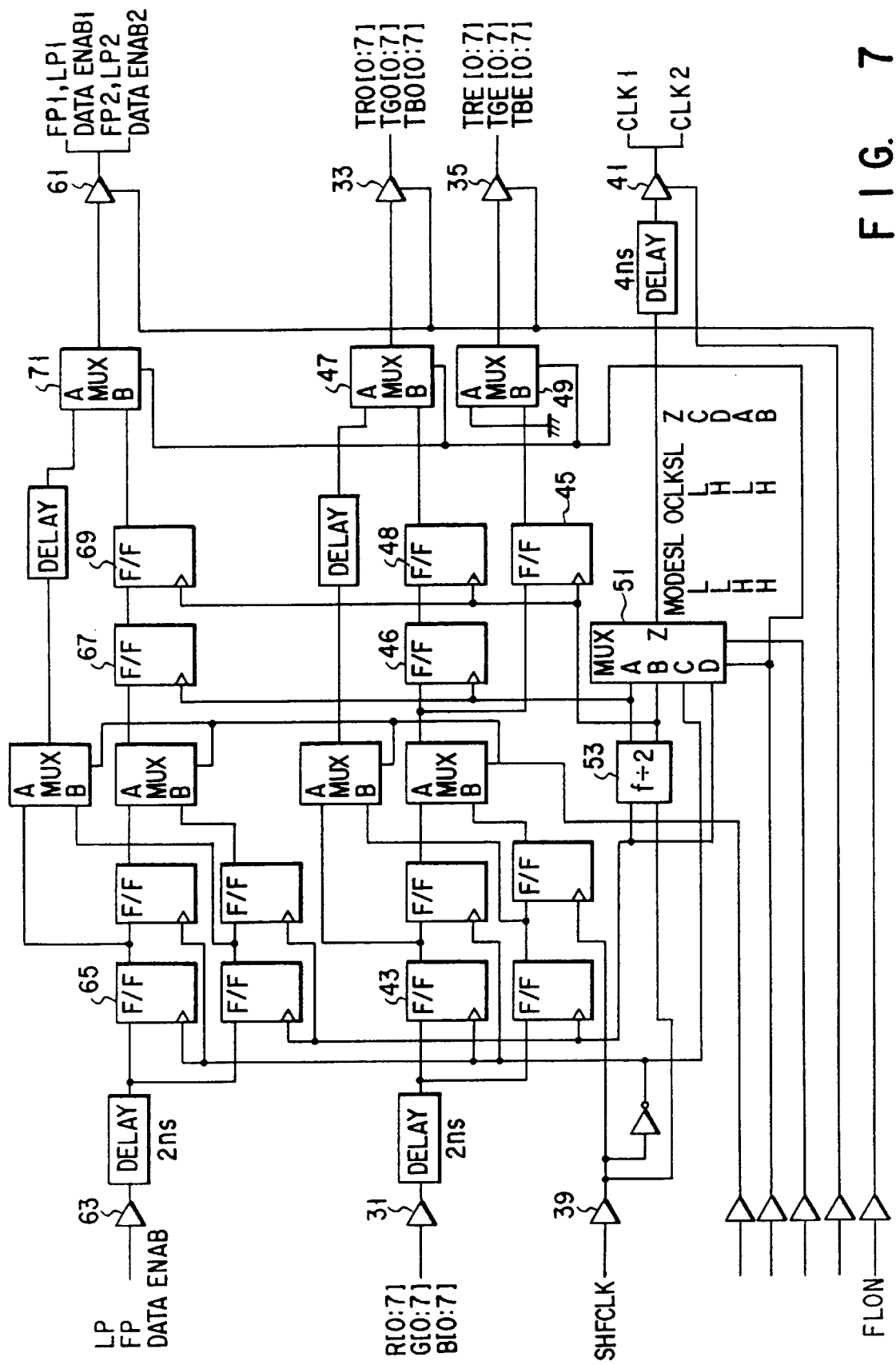
FIG. 7 is a detailed circuit diagram showing the inside of a display control gate array shown in FIG. 5.

FIG. 7 is a detailed circuit diagram showing the display control gate array 29 shown in FIG. 5.

As is shown in FIG. 7, the display control gate array 29 includes line drivers 63, 31, 39, 61, 33, 35 and 41, flip-flops (F/F) 65, 67, 69, 43, 46, 48 and 45, multiplexers 71, 47, 49 and 51, and a ½ division circuit 53. The F/F 43 latches 6-bit R, G and B input data in synchronism with the falling edge of a shift clock (SHFCLK) shown in FIG. 8A. The clock frequency of the shift clock signal (SHFCLK) is divided to ½ by the ½ division circuit 53 (see FIG. 8D). The F/F 46 and F/F 48 latch the odd-number-th R, G and B signals in synchronism with the clock signal with ½ frequency, and the F/F 45 latches the even-number-th R, G and B signals in synchronism with the clock signal. The display signals latched by the F/F 48 and the display signals latched by the F/F 45 are supplied to the multiplexers (MUX) 47 and 49. The multiplexers (MUX) 47 and 49 output the supplied display signals via the line drivers 33 and 35 (see FIGS. 8F and 8G). The multiplexer 51 outputs the first and second clock signals (CLK1, CLK2) frequency-divided by the ½ division circuit 53.

Similarly, the control signals (LP(HSYNC), FP(VSYNC) and DATA ENAB) input via the line driver 63 are latched by the F/F 65 and then latched by the F/F 67 and F/F 69 in synchronism with the clock signal frequency-divided to ½. The multiplexer 71 outputs via the line driver 61 the control signals (FP1, LP1, DATA ENAB1, FP2, LP2 and DATA ENAB2) frequency-divided to ½.

In the embodiment shown in FIGS. 5 and 6 having the above structure, two low voltage P-S converters, as shown in FIG. 2, and two low voltage S-P converters, as shown in FIG. 3, are used. In FIG. 5, the first low voltage P-S converter 5 is supplied with odd-number-th R, G and B signals, control signals (FP, LP, DATA ENAB) and clock signal (CLK1), and the second low voltage P-S converter 6 is supplied with even-number-th R, G and B signals, control signals (FP, LP, DATA ENAB) and clock signal (CLK2). The display control gate array 29 sorts 6-bit R, G and B digital signals and control signals (FP, LP, DATA ENAB) output from the display controller 1 into odd-number-th 6-bit R, G and B digital signals and control signals (FP, LP, DATA ENAB) and even-number-th 6-bit R, G and B digital signals and control signals (FP, LP, DATA ENAB). In addition, the display control gate array 29 divides the frequency of the clock signal to ½, thereby producing first and second clock signals (CLK1, CLK2) and supplying them to the first and second low voltage P-S converters 5 and 6, respectively.

Figure 8:
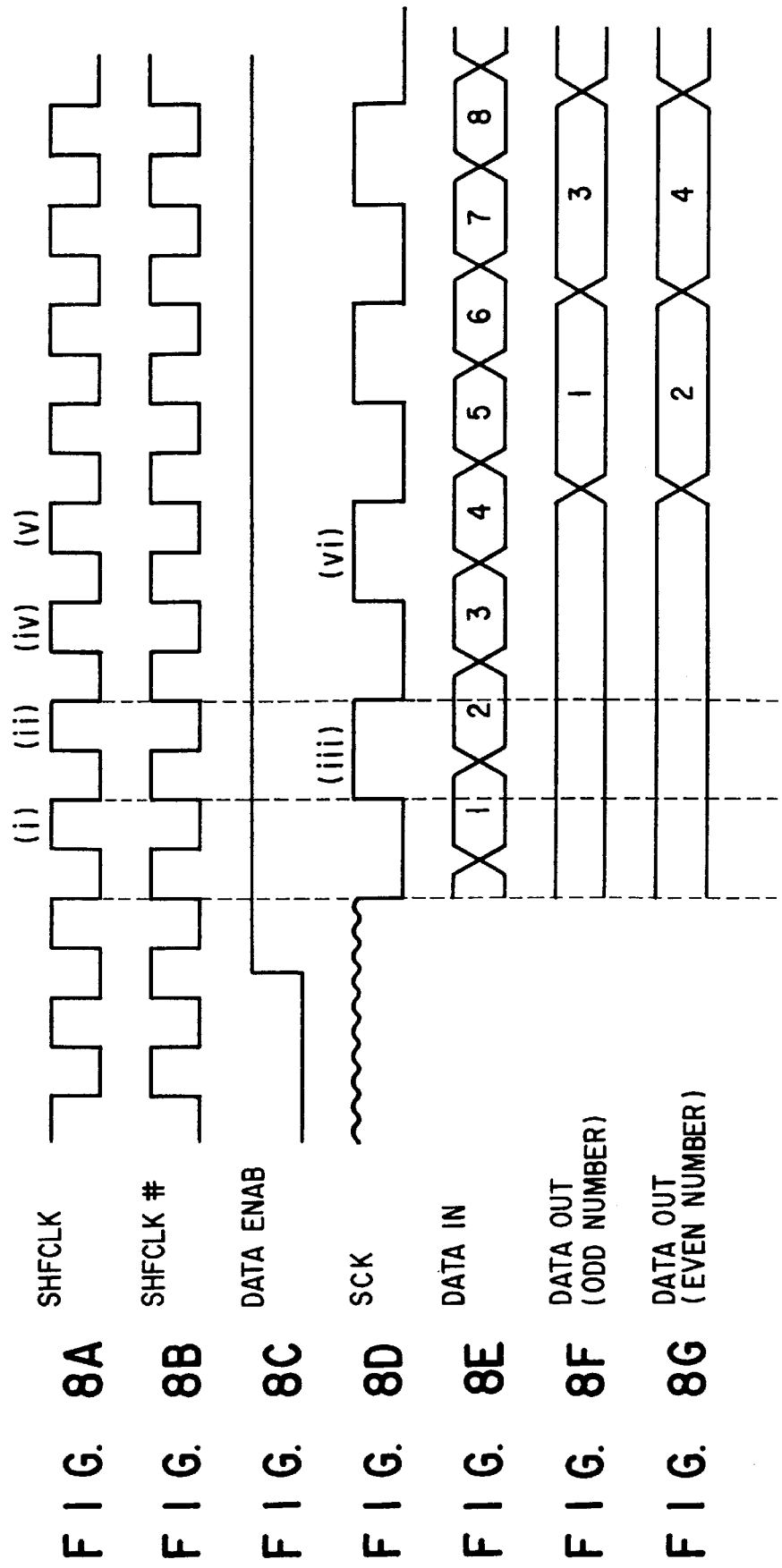
FIGS. 8A through 8G are timing charts showing input/output timing among the circuits shown in FIG. 7.

Specifically, display data 1 shown in FIG. 8C is latched by the F/F 43 in synchronism with the falling edge of clock (i) in FIG. 8A. Then, display data 2 is latched by the F/F 43 in synchronism with the falling edge of clock (ii) in FIG. 8A. At this time, the F/F 46 latches the display data 1 in synchronism with the rising edge of clock (SCK)(iii) in FIG. 8D and latches the display data 2 in synchronism with the falling edge of clock (ii) in FIG. 8D. Then, display data C is latched by the F/F 43 in synchronism with the falling edge of clock (iv) in FIG. 8A. At this time, the display data 2 is latched by the F/F 45.

As a result, the display data 1 is latched by the F/F 46, the display data 2 by the F/F 45, and the display data 3 by the F/F 43. Then, display data D is latched by the F/F 43 in synchronism with the falling edge of clock (v) shown in FIG. 8A. In this case, the F/F 48 latches the display data 1 in synchronism with the clock (vi) shown in FIG. 8D, the F/F46 latches the display data 3, and the F/F 45 latches the display data 3 in synchronism with clock (v) shown in FIG. 8A. Consequently, the output timing of the display data 1 latched by the F/F 48 and the display data 2 latched by the F/F 45 is established by the multiplexers 47 and 49, and the display data 1 and display data 2 are output via the line drivers 33 and 35. Similarly, the odd-number-th display data and even-number-th display data are successively sorted and output simultaneously. The output odd-number-th display data and even-number-th display data are supplied to the low voltage P-S converter 5 and low voltage P-S converter 6. Since the subsequent operations are the same as shown in FIGS. 2 and 3, a description thereof is omitted.

With the above structure, even if the amount of display data is increased, the data can be transmitted without increasing the clock frequency, and electromagnetic interference can be eliminated.

In the above-described embodiment, the flat panel display is employed as display apparatus. This invention, however, is applicable to a CRT display. Besides, though the above-described embodiment is directed to the portable computer, this invention is also applicable to a desk-top computer.

FIGS. 9 and 10 are block diagrams showing another embodiment of the invention wherein the display resolution is 800×600 dots. As shown in FIGS. 9 and 10, a display controller 101 is composed of a one-chip gate array including a low voltage parallel/serial (P-S) conversion circuit (driver). On the other hand, as shown in FIG. 10, a flat panel-side panel gate array 103 is composed of a one-chip gate array including a low voltage serial/parallel (S-P) conversion circuit (receiver). With this structure, the area for mounting elements can be further reduced.

Figure 11:
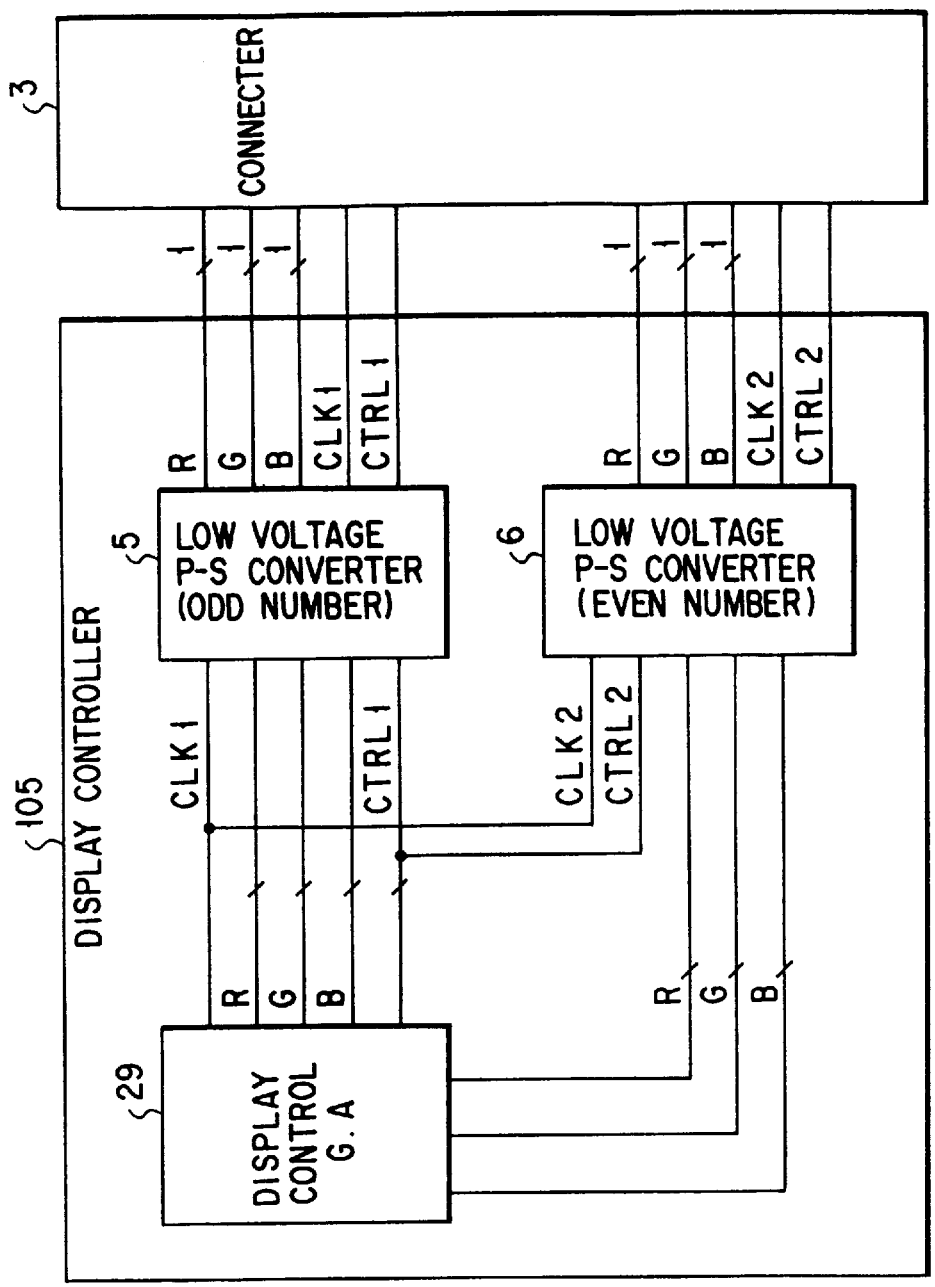
FIG. 11 is a block diagram of the PC body section showing still another embodiment of the invention in which the display resolution is 1024×768.

FIGS. 11 and 12 are block diagrams showing another embodiment of the invention wherein the display resolution is 1024×768 dots. As shown in FIG. 11, a display controller 105 is composed of a one-chip gate array including the display control gate array 29, low voltage P-S converter (driver) 5 for odd-number-th data, and low voltage P-S converter (driver) 6 for even-number-th data.

As shown in FIG. 12, a flat panel-side panel gate array 107 is composed of a one-chip gate array including the low voltage S-P converter (receiver) 19 for odd-number-th data, and low voltage S-P converter (receiver) 20 for even-number-th data.

In the above embodiments, each of the R, G and B color signals has a 6-bit construction, but may have a 8-bit construction. In such a case, as shown in FIG. 13, R bits 6 and 7, G bits 6 and 7 and B bits 6 and 7 are output from OUT 3.

What is claimed is:

1. An interface system for display signals between a display apparatus and a display controller for generating parallel display color signals, a control signal, and a first clock signal which have a first potential to drive the display apparatus, said interface system comprising:

a parallel-serial conversion circuit for converting the parallel display color signals and the control signal output from the display controller, to a serial signal having a second potential lower than the first potential, and converting the first clock signal output from the display controller to a second clock signal which has the second potential; and a serial-parallel conversion circuit, for converting the serial signal output from the parallel-serial conversion circuit to the parallel display color signals and the control signal, and converting the second clock signal output from the parallel-serial conversion circuit to the first clock signal.

2. The interface system according to claim 1, wherein said display apparatus is a display apparatus displayable with a resolution of no less than 800 dots×600 lines.

3. The interface system according to claim 1, wherein said first potential is a CMOS/TTL level, and said second potential is less than 1 volt.

4. A display signal interface system comprising:

a display apparatus;

a display controller for driving the display apparatus, the display controller having a parallel-serial conversion circuit for converting parallel display color signals and a control signal which have a first potential to a serial signal which has a second potential lower than the first potential, and converting a first clock signal of the first potential to a second clock signal of the second potential; and a serial-parallel conversion circuit, for converting the serial signal output from the parallel-serial conversion circuit to the parallel display color signals and the control signal, and converting the second clock signal output from the parallel-serial conversion circuit to the first clock signal.

5. The interface system according to claim 4, wherein said display apparatus is a display apparatus displayable with a resolution of no less than 800 dots×600 lines.

6. The interface system according to claim 4, wherein said first potential is a CMOS/TTL level, and said second potential is less than 1 volt.

7. A computer comprising:

a computer main body;

a display unit having a flat panel;

a display controller, included in the computer main body, for producing parallel display color signals, each having a first potential and n-bits (n=a positive inter of 2 or more) per pixel, a control signal having the first potential, and a first clock signal having the first potential;

a parallel-serial conversion circuit, included in the computer main body, for converting the parallel display color signals and the control signal output from the display controller to a serial signal of a second potential lower than the first potential, and converting the first clock signal output from the display controller to a second clock signal of the second potential;

a cable for electrically connecting said computer main body and said display unit and serially transferring the serial signal and the second clock signal output from the parallel-serial conversion circuit; and a serial-parallel conversion circuit, included in the display unit, for converting the serial signal transferred via said cable to the parallel display color signals and the control signal, and for converting said second clock signal transferred via the cable to the first clock signal, the parallel display color signals, the control signal, and the first clock signal being supplied to said flat panel.

8. The computer according to claim 7, wherein said display unit is a display apparatus displayable with a resolution of no less than 800 dots×600 lines.

9. The computer according to claim 7, wherein said first potential is a CMOS/TTL level, and said second potential is less than 1 volt.

10. A computer comprising:

a computer main body;

a display unit having a flat panel;

a display controller, included in the computer main body, for producing parallel display color signals, each having a first potential and n-bits (n=a positive integer of 2 or more) per pixel, a control signal having the first potential, and a first clock signal having the first potential, said display controller including a parallel-serial conversion circuit for converting the display color signals and the control signal to a serial signal of a second potential lower than the first potential, and converting the first clock signal to a second clock signal of the second potential;

a cable for electrically connecting said computer main body and said display unit and serially transferring the serial signal and the second clock signal output from said parallel-serial conversion circuit; and a serial-parallel conversion circuit, included in the display unit, for converting the serial signal transferred via said cable to the parallel display color signals, and for converting said second clock signal transferred via the cable to the first clock signal, the parallel display color signals, the control signal, and the first clock signal being supplied to said flat panel.

11. The computer according to claim 10, wherein said display unit is a display apparatus displayable with a resolution of no less than 800 dots×600 lines.

12. The computer according to claim 10, wherein said first potential is a CMOS/TTL level, and said second potential is less than 1 volt.

13. A display signal interface system in a computer comprising a main body, a display unit with a flat panel, and a cable for electrically connecting the main body and the display unit, wherein parallel display color signals, each having a first potential and n-bits (n=an integer of 2 or more) per pixel, a control signal having the first potential, and a first clock signal of the first potential are produced, said parallel display color signals and the control signal are converted to a serial signal of a second potential lower than the first potential, said first clock signal is converted to a second clock signal of the second potential, and the serial signal and the second clock signal are output to the cable, and the serial signal supplied from the cable is converted to parallel display color signals on the display unit side, and the second clock signal is converted to the first clock signal, thereby driving the flat panel.

14. The display signal interface system according to claim 13, wherein said flat panel is displayable with a resolution of no less than 800 dots×600 lines.

15. The display signal interface system according to claim 13, wherein said first potential is a CMOS/TTL level, and said second potential is less than 1 volt.

16. An interface system for signals between a display apparatus and a display controller for driving the display apparatus, said interface system comprising:

a display device including a parallel-serial conversion circuit for converting parallel display color signals of R (Red), G (Green), and B (Blue) which are plural-bit parallel signals each having a first potential to serial signals each having a second potential lower than the first potential, converting a control signal representing the beginning of effective display data, a field pulse corresponding to one screen cycle, and a latch pulse corresponding to one line cycle which have the first potential to the serial signals, and converting a first clock signal of the first potential to a second clock signal of the second potential; and a gate array for driving the display apparatus, said gate array including a serial-parallel conversion circuit, included in the display apparatus side, for converting the serial signals of the display color signals output from the parallel-serial conversion circuit to the parallel display color signals, converting the serial signals output from the parallel-serial conversion circuit to the control signal, the field pulse, and the latch pulse, and converting the second clock signal output from the parallel-serial conversion circuit to the clock signal.

17. A method for interfacing a display apparatus and a display controller for generating parallel display color signals, a control signal, and a first clock signal which have a first potential to drive the display apparatus, comprising the steps of:

converting the parallel display color signals and the control signal output from the display controller, to a serial signal having a second potential lower than the first potential, and converting the first clock signal output from the display controller to a second clock signal which has the second potential; and converting the serial signal to the parallel display color signals and the control signal, and converting the second clock signal to the first clock signal.

18. The method of claim 17, wherein said display apparatus displayable with high resolution is a display apparatus displayable with a resolution of no less than 800 dots×600 lines.

19. The method of claim 17, wherein said first potential is a CMOS/TTL level, and said second potential is less than 1 volt.

20. A method in a display signal interface system having a display apparatus, display controller for driving the display apparatus, the display controller having a parallel-serial conversion circuit, the method comprising the steps of:

converting the parallel display color signals and the control signal output from the display controller, to a serial signal having a second potential lower than the first potential, and converting the first clock signal output from the display controller to a second clock signal which has the second potential using the parallel-serial conversion circuit; and converting the serial signal to the parallel display color signals and the control signal, and converting the second clock signal to the first clock signal.

21. The method of claim 20, wherein said display apparatus displayable with high resolution is a display apparatus displayable with a resolution of no less than 800 dots×600 lines.

22. The method of claim 20, wherein said first potential is a CMOS/TTL level, and said second potential is less than 1 volt.

23. A method in a computer system having a main computer body, a display unit having a first panel, a display controller, included in the computer main body, for producing parallel display color signals, each having a first potential and n-bits (n=a positive integer of 2 or more) per pixel, a control signal having the first potential, and a first clock signal having the first potential, the method comprising the steps of:

converting the parallel display color signals and the control signal output from the display controller to a serial signal of a second potential lower than the first potential, and converting the first clock signal output from the display controller to a second clock signal of the second potential using a parallel-serial conversion circuit, included in the computer main body;

serially transferring the serial signal and the second clock signal output from the parallel-serial conversion circuit using a cable for electrically connecting said computer main body and said display unit; and converting the serial signal transferred via said cable to the parallel display color signals and the control signal, and for converting said second clock signal transferred via the cable to the first clock signal, the parallel display color signals, the control signal, and the first clock signal being supplied to said first panel using a serial-parallel conversion circuit, included in the computer main body.

24. The method of claim 23, wherein said display apparatus displayable with high resolution is a display apparatus displayable with a resolution of no less than 800 dots×600 lines.

25. The method of claim 23, wherein said first potential is a CMOS/TTL level, and said second potential is less than 1 volt.

26. A method in a computer system having a main computer body, a display unit having a first panel, a display controller, included in the computer main body, for producing parallel display color signals, each having a first potential and n-bits (n=a positive integer of 2 or more) per pixel, a control signal having the first potential, and a first clock signal having the first potential, said display controller including a parallel-serial conversion circuit, the method comprising the steps of:

converting the parallel display color signals and the control signal output from the display controller to a serial signal of a second potential lower than the first potential, and converting the first clock signal output from the display controller to a second clock signal of the second potential using the parallel-serial conversion circuit;

serially transferring the serial signal and the second clock signal output from the parallel-serial conversion circuit using a cable for electrically connecting said computer main body and said display unit; and converting the serial signal transferred via said cable to the parallel display color signals and the control signal, and for converting said second clock signal transferred via the cable to the first clock signal, the parallel display color signals, the control signal, and the first clock signal being supplied to said first panel using a serial-parallel conversion circuit, included in the display unit.

27. The method of claim 26, wherein said display apparatus displayable with high resolution is a display apparatus displayable with a resolution of no less than 800 dots×600 lines.

28. The method of claim 26, wherein said first potential is a CMOS/TTL level, and said second potential is less than 1 volt.

29. A method in a display signal interface system in a computer comprising a main body, a display unit with a flat panel, and a cable for electrically connecting the main body and the display unit, the method comprising the steps of:

producing parallel display color signals, each having a first potential and n-bits (n=an integer of 2 or more) per pixel, a control signal having the first potential, and a first clock signal of the first potential;

converting said parallel display color signals and the control signal to a serial signal of a second potential lower than the first potential;

converting said first clock signal to a second clock signal of the second potential;

outputting the serial signal and the second clock signal to the cable;

converting the serial signal supplied from the cable to parallel display color signals on the display unit side; and converting the second clock to the first clock signal, thereby driving the flat panel.

30. The method of claim 29, wherein said flat panel is displayable with a resolution of no less than 800 dots×600 lines.

31. The method of claim 29, wherein said first potential is a CMOS/TTL level, and said second potential is less than 1 volt.

32. A method in an interface system for interfacing a display apparatus and a display controller for driving the display apparatus, said interface system having a display device including a parallel-serial conversion circuit, a gate array for driving the display apparatus, said gate array including a serial-parallel conversion circuit, included in the display apparatus side, the method comprising the steps of:

converting parallel display color signals of R (Red), G (Green), and B (Blue) which are plural-bit parallel signals each having a first potential to serial signals each having a second potential lower than the first potential using the parallel-serial conversion circuit;

converting a control signal representing the beginning of effective display data, a field pulse corresponding to one screen cycle, and a latch pulse corresponding to one line cycle which have the first potential to the serial signals, and converting a first clock signal of the first potential to a second clock signal of the second potential; and converting the serial signals of the display color signals output from the parallel-serial conversion circuit to the parallel display color signals, converting the serial signals output from the parallel-serial conversion circuit to the control signal, the field pulse, and the latch pulse, and converting the second clock signal output from the parallel-serial conversion circuit to the clock signal using the serial-parallel conversion circuit.

* * * * *

UNITED STATES PATENT AND TRADEMARK OFFICE
CERTIFICATE OF CORRECTION

PATENT NO.     : 6,147,672
DATED          : November 14, 2000
INVENTOR(S)    : Hajime Shimamoto It is certified that error appears in the above-identified patent and that said Letters Patent is hereby corrected as shown below:

Column 10,
Line 4, "positive inter" should read -- positive integer --.

Signed and Sealed this

Twenty-first Day of October, 2003

JAMES E. ROGAN
*Director of the United States Patent and Trademark Office*